United States Patent

Lin

[11] Patent Number: 6,009,797
[45] Date of Patent: Jan. 4, 2000

[54] ROTATING STRUCTURE OF AN OVEN

[76] Inventor: Ching-Mei Lin, No. 15, Lane 487, Min-Sheng Street, Kuei-Jen Shiang, Tainan Shien, Taiwan

[21] Appl. No.: 09/386,427

[22] Filed: Aug. 31, 1999

[51] Int. Cl.[7] .............. A47J 37/00; A47J 37/04; A47J 37/07
[52] U.S. Cl. .............. 99/421 H; 99/419; 99/482
[58] Field of Search ................. 99/339–341, 419–421 V, 99/400, 401, 444–450, 482; 126/25 R, 9 R, 41 R; 426/523, 466

[56] References Cited

U.S. PATENT DOCUMENTS

| | | | |
|---|---|---|---|
| 3,113,504 | 12/1963 | Reed | 99/421 H |
| 3,247,827 | 4/1966 | Cremer | 99/421 H |
| 3,733,999 | 5/1973 | Bernstein | 99/339 X |
| 4,598,690 | 7/1986 | Hsu | 126/25 R |
| 4,810,856 | 3/1989 | Jovanovic | 219/401 |
| 4,924,766 | 5/1990 | Hitch | 99/421 HV |
| 5,195,425 | 3/1993 | Koziol | 99/447 X |
| 5,333,540 | 8/1994 | Mazzocchi | 99/450 X |
| 5,421,318 | 6/1995 | Unruh et al. | 126/9 R |
| 5,536,518 | 7/1996 | Rummel | 426/523 |
| 5,649,475 | 7/1997 | Murphy et al. | 99/421 H |
| 5,819,639 | 10/1998 | Spell | 99/446 X |
| 5,832,811 | 11/1998 | King | 99/419 X |

*Primary Examiner*—Timothy Simone
*Attorney, Agent, or Firm*—Rosenberg, Klein & Lee

[57] ABSTRACT

A rotating structure of an oven in the present invention includes a first fixing tray, a second fixing tray and two axle rods. On the outer surface of the first fixing tray is provided with a protruding against member, and on the inner surface are provided with two connecting portions respectively with a screwing hole in the center. On the outer surface of the second fixing tray is provided with a protruding shaft member, and on the inner surface are provided with two protruding posts respectively with an inserting hole in the center. One end of each axle rod is defined as a thread section, and the other end is provided with an inserting end. When assembling, screw the thread sections of the two axle rods respectively into the screwing holes of the connecting portions of the first fixing tray and then insert the inserting ends of the two axle rods respectively into the inserting holes of the protruding posts on the second fixing tray so as to definitely prevent the axle rods from idling.

1 Claim, 5 Drawing Sheets

ROTATING STRUCTURE OF AN OVEN

BACKGROUND OF THE INVENTION

1. Field of the Invention

The present invention relates to a rotating structure of an oven, which is provided with two axle rods to stick through the meat, chicken or duck to be roasted in an oven, and more particularly to the rotating structure with innovative features for the meat, chicken or duck to be definitely secured and rotated with the rotation of the rotating structure in an oven.

2. Description of the Related Art

A conventional rotating axle rod 1 used for sticking through the meat, chicken or duck to be roasted in an oven, as shown in FIG. 1, is provided with two fixing members 2. Each fixing member 2 is provided with two corresponding slant wings 21 for clamping the meat, chicken or duck 10 and a screw 22 screwing each fixing member 2 to mount on the rotating axle rod 1, as shown in FIG. 2. One end of the axle rod 1 is provided with an against portion 11 to be placed against the against groove 31 on the inner wall of the oven 3. The other end of the axle rod 1 is defined as a sleeve end 12 to be sleeved in the output shaft 33 of the motor 32 of the oven 3. Therefore, when intending to roast the meat, chicken or duck 10, take the rotating axle rod 1 out of the oven 3 and dismount one fixing member 2 first. Then stick the rotating axle rod 1 into the meat, chicken or duck 10 by the sleeve end 12, mount the fixing member 2 on the axle rod 1 again and use the wings 21 of the two fixing members 2 to clamp the meat, chicken or duck 10 fixedly. At last, place the axle rod 1 with the meat, chicken or duck 10 in the oven 3 for the meat, chicken or duck 10 to be roasted at high temperature.

In the process of roasting, the axle rod 1 will rotate with the function of the motor 32, and the moisture of the meat, chicken or duck 10 will be evaporated gradually so that the volume of the meat, chicken or duck 10 will be contracted slightly. Thus, the meat, chicken or duck 10 originally firmly clamped by the fixing members 2 will no more be clamped firmly, a gap between the axle rod 1 and the meat, chicken or duck 10 will appear so that the meat, chicken or duck 10 can not rotate with the rotation of the axle rod 1, and the axle rod 1 will rotate idly.

SUMMARY OF THE INVENTION

Therefore, the present invention is to provide a rotating structure of an oven that substantially obviates the drawback of the related conventional art.

An object of the present invention is to provide a rotating structure of an oven whose two axle rods are provided for the meat, chicken or duck to be firmly mounted on to be roasted in an oven.

Another object of the present invention is to provide a rotating structure of an oven whose two axle rods can rotate in proper order of circular orbit so that the rotating structure will not idle and can still make the meat, chicken or duck be rotated successfully even though the meat, chicken or duck is contracted because the moisture is evaporated.

Accordingly, a rotating structure of an oven in the present invention includes a first fixing tray, a second fixing tray and two axle rods. On the outer surface of the first fixing tray is provided with a protruding against member, and on the inner surface are provided with two connecting portions respectively with a screwing hole in the center. On the outer surface of the second fixing tray is provided with a protruding shaft member, and on the inner surface are provided with two protruding posts respectively with an inserting hole in the center. One end of each axle rod is defined as a thread section, and the other end is provided with an inserting end. When assembling, screw the thread sections of the two axle rods respectively into the screwing holes of the connecting portions of the first fixing tray and then insert the inserting ends of the two axle rods respectively into the inserting holes of the protruding posts on the second fixing tray so as to definitely prevent the axle rods from idling when the meat, chicken or duck being roasted in the oven.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
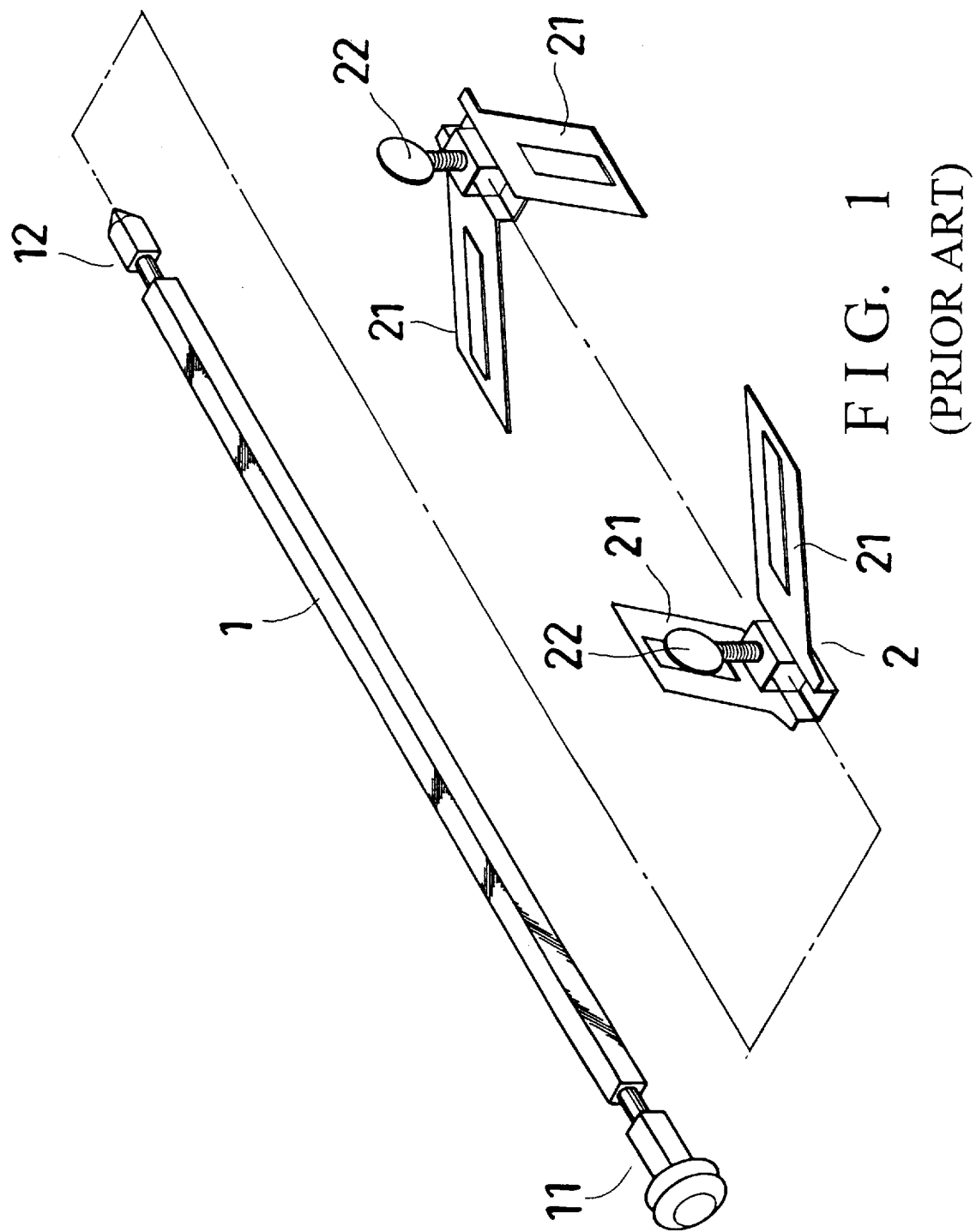
FIG. 1 is a perspective exploded view of a conventional rotating axle rod.
Figure 2:
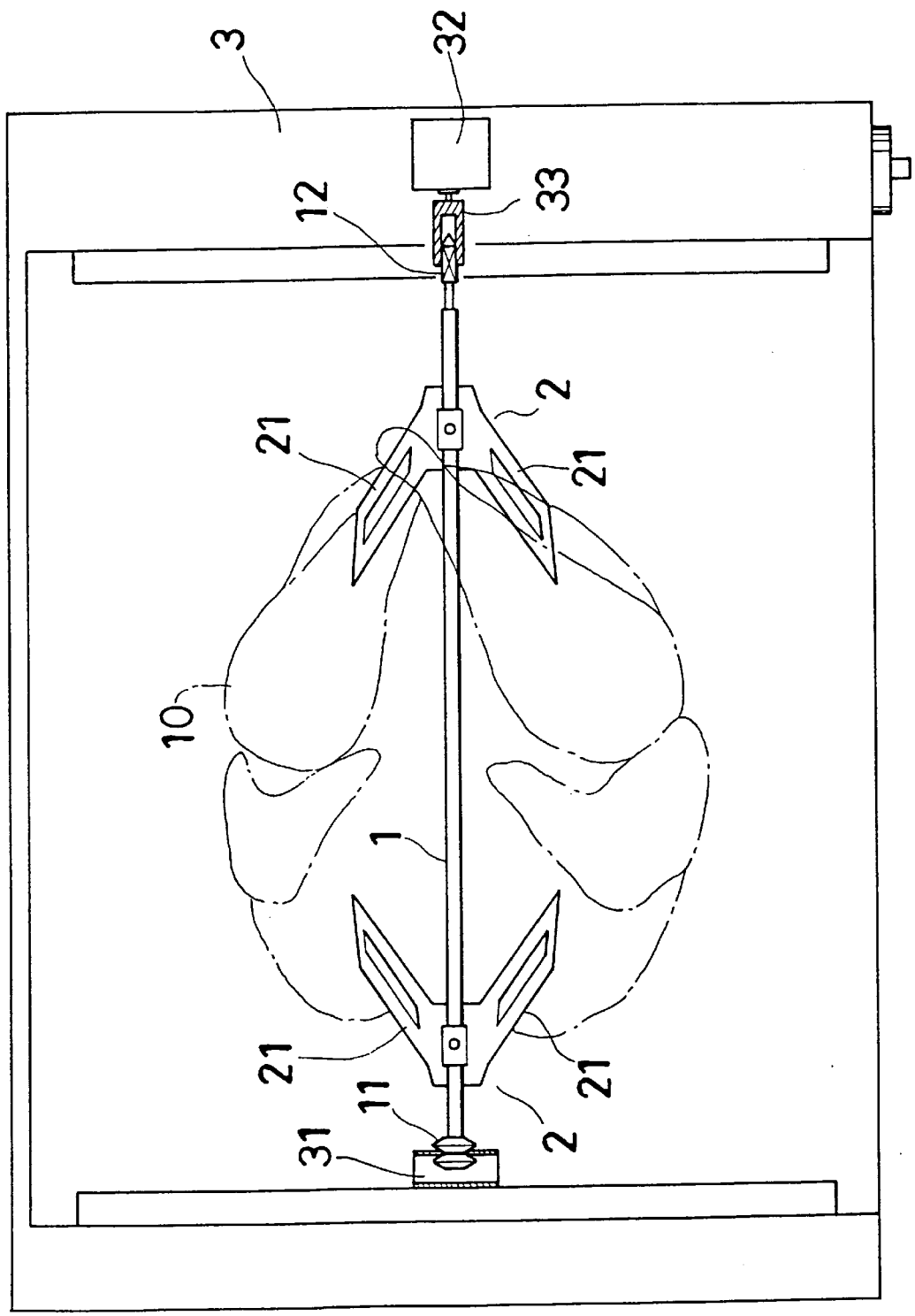
FIG. 2 is a sectional view of a conventional rotating axle rod with chicken or duck being applied in an oven.
Figure 3:
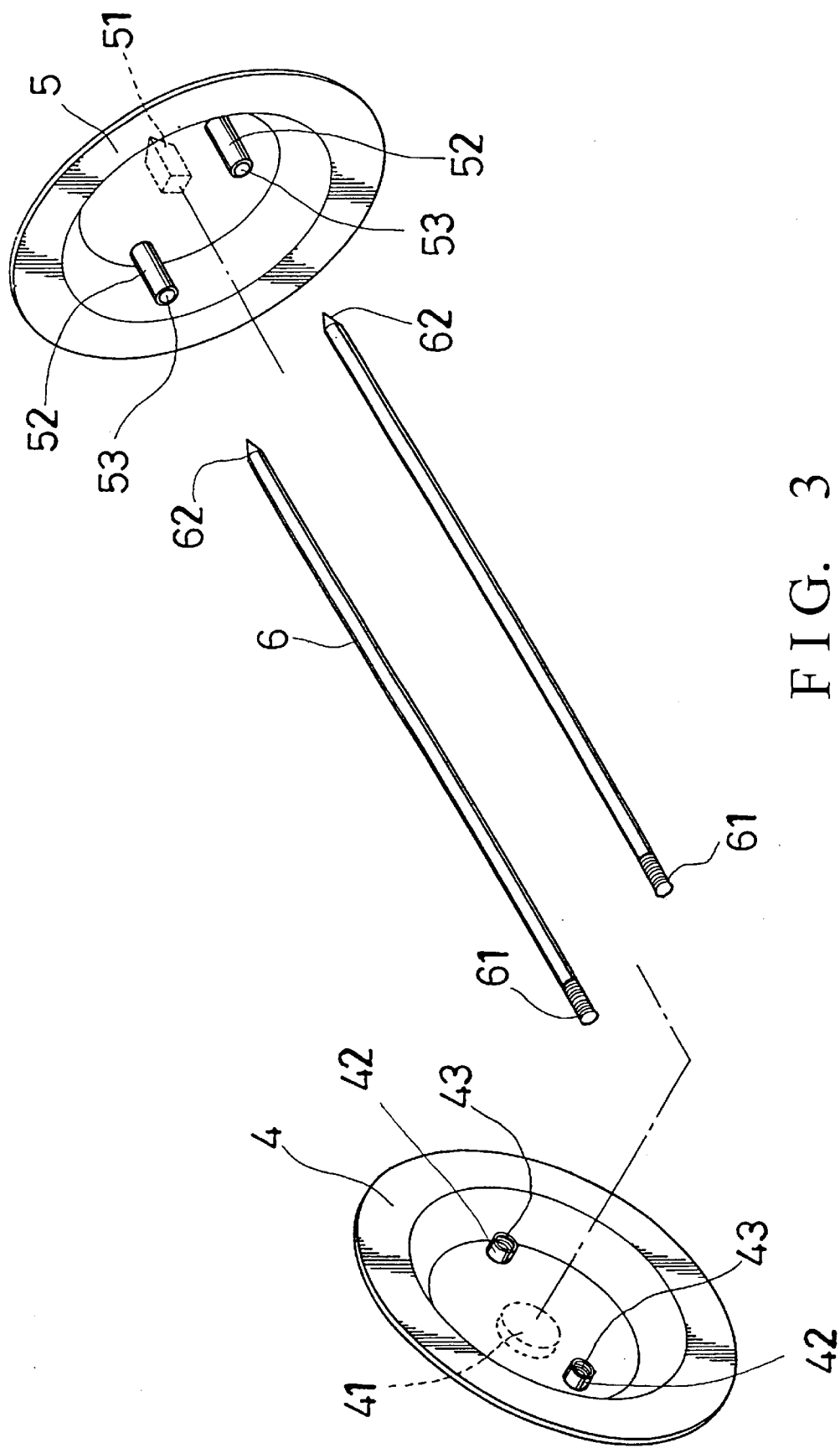
FIG. 3 is a perspective exploded view of an embodiment of a rotating structure of an oven in accordance with the present invention.

Referring to FIG. 3, a preferred embodiment of a rotating structure in the present invention includes a first fixing tray 4, a second fixing tray 5 and two axle rods 6.

On the outer surface of the first fixing tray 4 is provided with a protruding against member 41, and on the inner surface of the first fixing tray 4 are provided with two connecting portions 42 respectively with a screwing hole 43 in the center. On the outer surface of the second fixing tray 5 is provided with a protruding shaft member 51, and on the inner surface of the second fixing tray 5 are provided with two protruding posts 52 respectively with an inserting hole 53 in the center. One end of each axle rod 6 is defined as a thread section 61, and the other end of each axle rod 6 is provided with an inserting end 62. When assembling, screw the thread sections 61 of the two axle rods 6 respectively into the screwing holes 43 of the connecting portions 42 of the first fixing tray 4 and then insert the inserting ends 62 of the two axle rods 6 respectively into the inserting holes 53 of the protruding posts 52 on the second fixing tray 5 so as to definitely prevent the axle rods 6 from idling when the meat, chicken or duck 7 being roasted in the oven 3.

Figure 4:
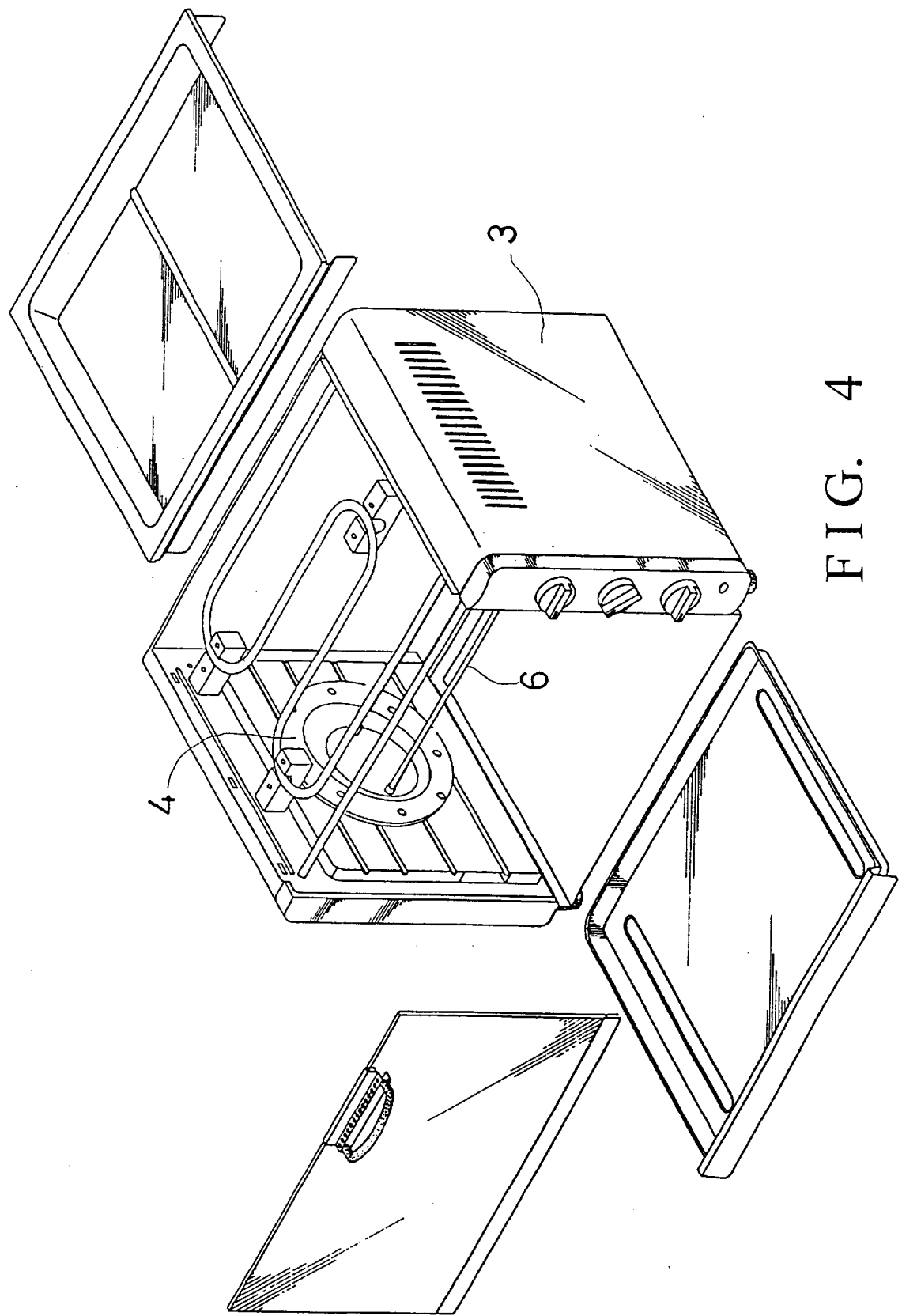
FIG. 4 is a perspective schematic view of an embodiment of the rotating structure being assembled and applied in an oven in accordance with the present invention; and, FIG. 5 is a sectional view of an embodiment of the rotating structure with chicken or duck being assembled and applied in an oven in accordance with the present invention.
Figure 5:
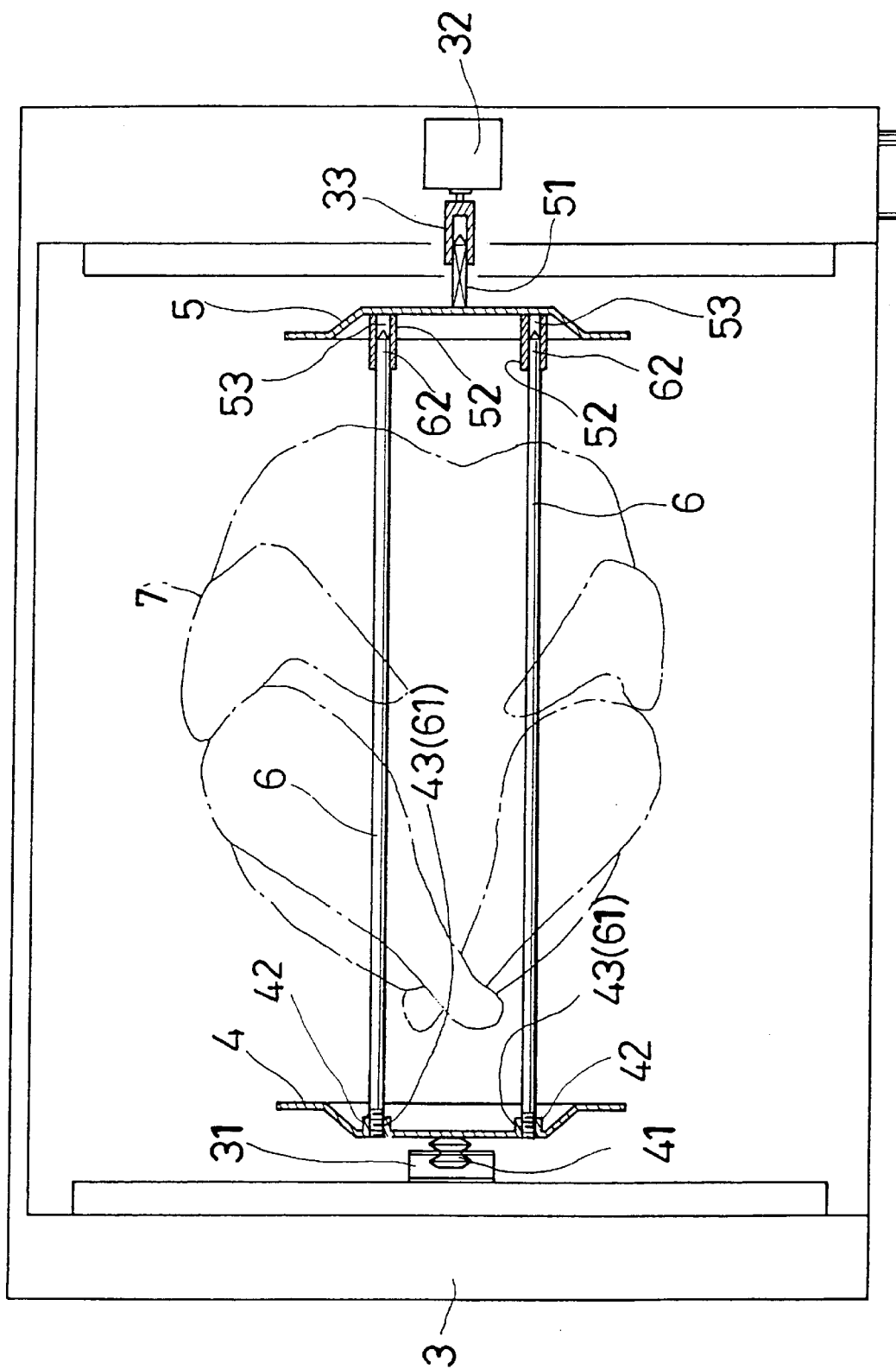

When applying, referring to FIGS. 4 and 5, first, take off the second fixing tray 5, stick the inserting ends 62 of the axle rods 6 through the meat, chicken or duck 7 to be roasted, and then insert the inserting ends 62 of the axle rods 6 in the inserting holes 53 of the second fixing tray 5 again so as to make the meat, chicken or duck 7 be mounted and secured on the axle rods 6. At last, place the assembled rotating structure with the meat, chicken or duck 7 in the oven 3, insert the against portion 41 of the first fixing tray 4 in the against groove 31 and make the protruding shaft member 51 of the second fixing tray 5 be sleeved in the output shaft 33 of the motor 32 of the oven 3. When the motor 32 starts operating, the second fixing tray 5 will rotate with the operation of the output shaft 33, and the first fixing tray 4 will also rotate by the connection of the two axle rods 6 at the same time. Accordingly, the two axle rods 6 will rotate in proper order of circular orbit so as to make the meat, chicken or duck 7 be rotated successfully even though the meat, chicken or duck 7 is contracted because the moisture is evaporated.

While the preferred embodiments of the invention have been described above, it will be recognized and understood that various modifications may be made therein and the appended claims are intended to cover all such modifications which may fall within the spirit and scope of the invention.

What is claimed is:

1. A rotating structure of an oven comprising:

a first fixing tray being provided with a protruding against member on the outer surface, on the inner surface of said first fixing tray being provided with two connecting portions respectively with a screwing hole in the center;

a second fixing tray being provided with a protruding shaft member on the outer surface in order to be sleeved in the output shaft of the motor of an oven, on the inner surface of said second fixing tray being provided with two protruding posts respectively with an inserting hole in the center; and, two axle rods being provided to stick through the meat, chicken or duck for roast and to connect said first and second fixing trays, one end of each said axle rod being defined as a thread section, the other end of each said axle rod being provided with an inserting end, when assembling, screwing said thread sections of said two axle rods respectively into said screwing holes of said connecting portions of said first fixing tray, then inserting said inserting ends of said two axle rods respectively into said inserting holes of said protruding posts on said second fixing tray so as to definitely make the meat, chicken or duck being rotated successfully with the operation of the motor in an oven.

* * * * *